(12) United States Patent  
Hirata

(10) Patent No.: US 10,491,831 B2  
(45) Date of Patent: Nov. 26, 2019

(54) IMAGE PICKUP APPARATUS, IMAGE PICKUP METHOD, AND RECORDING MEDIUM

(71) Applicant: JVC KENWOOD Corporation, Yokohama-shi, Kanagawa (JP)

(72) Inventor: Takuya Hirata, Yokohama (JP)

(73) Assignee: JVCKENWOOD CORPORATION, Kanagawa (JP)

( * ) Notice: Subject to any disclaimer, the term of this patent is extended or adjusted under 35 U.S.C. 154(b) by 0 days.

(21) Appl. No.: 16/258,382

(22) Filed: Jan. 25, 2019

(65) Prior Publication Data

US 2019/0273857 A1 Sep. 5, 2019

(30) Foreign Application Priority Data

Mar. 5, 2018 (JP) .................................. 2018-038349  
Mar. 5, 2018 (JP) .................................. 2018-038350

(51) Int. Cl.
| | |
|---|---|
| *H04N 5/235* | (2006.01) |
| *G06T 5/00* | (2006.01) |
| *H04N 5/232* | (2006.01) |
| *G06F 16/532* | (2019.01) |
| *G06T 5/40* | (2006.01) |
| *G06N 3/08* | (2006.01) |

(52) U.S. Cl.
CPC ......... *H04N 5/2351* (2013.01); *G06F 16/532* (2019.01); *G06T 5/008* (2013.01); *G06T 5/009* (2013.01); *G06T 5/40* (2013.01); *H04N 5/2352* (2013.01); *H04N 5/23218* (2018.08); *G06N 3/08* (2013.01); *G06T 2207/20081* (2013.01)

(58) Field of Classification Search
CPC .................................................... H04N 5/2351  
USPC ..................................................... 348/222.1  
See application file for complete search history.

(56) References Cited

U.S. PATENT DOCUMENTS

2012/0050561 A1* 3/2012 Kitajima ............ G06K 9/00664  
348/222.1

FOREIGN PATENT DOCUMENTS

JP 2009-151350 A 7/2009

* cited by examiner

*Primary Examiner* — Joel W Fosselman  
(74) *Attorney, Agent, or Firm* — Procopio, Cory, Hargreaves & Savitch LLP

(57) ABSTRACT

An image pickup apparatus according to an embodiment includes an image pickup unit configured to take an image including an object, a shooting condition control unit configured to control a shooting condition for the image pickup unit so that no blown out highlight occurs in a taken image taken by the image pickup unit, an object extraction unit configured to extract the object included in the taken image, a block-division unit configured to divide the taken image into a plurality of blocks according to the object extracted by the object extraction unit, a gamma correction unit configured to gamma-correct a gradation value of the taken image for each block by using a gamma value set for each block based on the object, and a boundary correction unit configured to correct the gradation value in a boundary area between adjoining blocks.

7 Claims, 8 Drawing Sheets

IMAGE PICKUP APPARATUS, IMAGE PICKUP METHOD, AND RECORDING MEDIUM

CROSS REFERENCE TO RELATED APPLICATION

This application is based upon and claims the benefit of priority from Japanese patent application No. 2018-038349, filed on Mar. 5, 2018 and Japanese patent application No. 2018-038350, filed on Mar. 5, 2018, the disclosure of which is incorporated herein in its entirety by reference.

BACKGROUND

The present disclosure relates to an image pickup apparatus, an image pickup method, and a recording medium.

Japanese Unexamined Patent Application Publication No. 2009-151350 discloses an image correction apparatus that corrects images to be displayed on a monitor. The image correction apparatus disclosed in Japanese Unexamined Patent Publication No. 2009-151350 displays a classification property designation window including an input image display area, area-of-interest designation, illumination designation, and object designation. Then, an operator designates an input image display area, an area of interest, illumination, and an object.

The above-described image correction apparatus divides an image into a plurality of partial areas and creates a histogram of each area. The image correction apparatus extracts a maximum value, a minimum value, an average value, etc. of RGB as feature values. By using a neural network, the image correction apparatus learns a classification coefficient for classifying input images whose image correction tendencies are similar to each other.

In camera images, there is a possibility of blown out highlights (i.e., overexposure) or blocked up shadows (i.e., underexposure) occurring in objects. Therefore, it is desirable to easily and appropriately correct images in image pickup apparatuses.

SUMMARY

An image pickup apparatus according to an embodiment includes: an image pickup unit configured to take an image including an object; a shooting condition control unit configured to control a shooting condition for the image pickup unit so that no blown out highlight occurs in a taken image taken by the image pickup unit; an object extraction unit configured to extract the object included in the taken image; an image search unit configured to search a network for a similar image similar to an object image of the object by using AI (Artificial Intelligence); and a gamma correction unit configured to gamma-correct the taken image with a gamma value corresponding to the similar image.

An image pickup method according to an embodiment includes: taking an image including an object; controlling a shooting condition so that no blown out highlight occurs in the taken image; extracting the object included in the taken image; searching a network for a similar image similar to an object image of the object by using AI; and gamma-correcting the taken image with a gamma value corresponding to the similar image.

A non-transitory computer readable medium storing a program according to an embodiment causes an image pickup apparatus to execute: controlling a shooting condition for a taken image including an object so that no blown out highlight occurs in the taken image; extracting the object included in the taken image; searching a network for a similar image similar to an object image of the object by using AI; and gamma-correcting the taken image with a gamma value corresponding to the similar image.

According to the embodiments, it is possible to provide an image pickup apparatus, an image pickup method, and a recording medium capable of appropriately generating a camera image.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

First Embodiment

Figure 1:
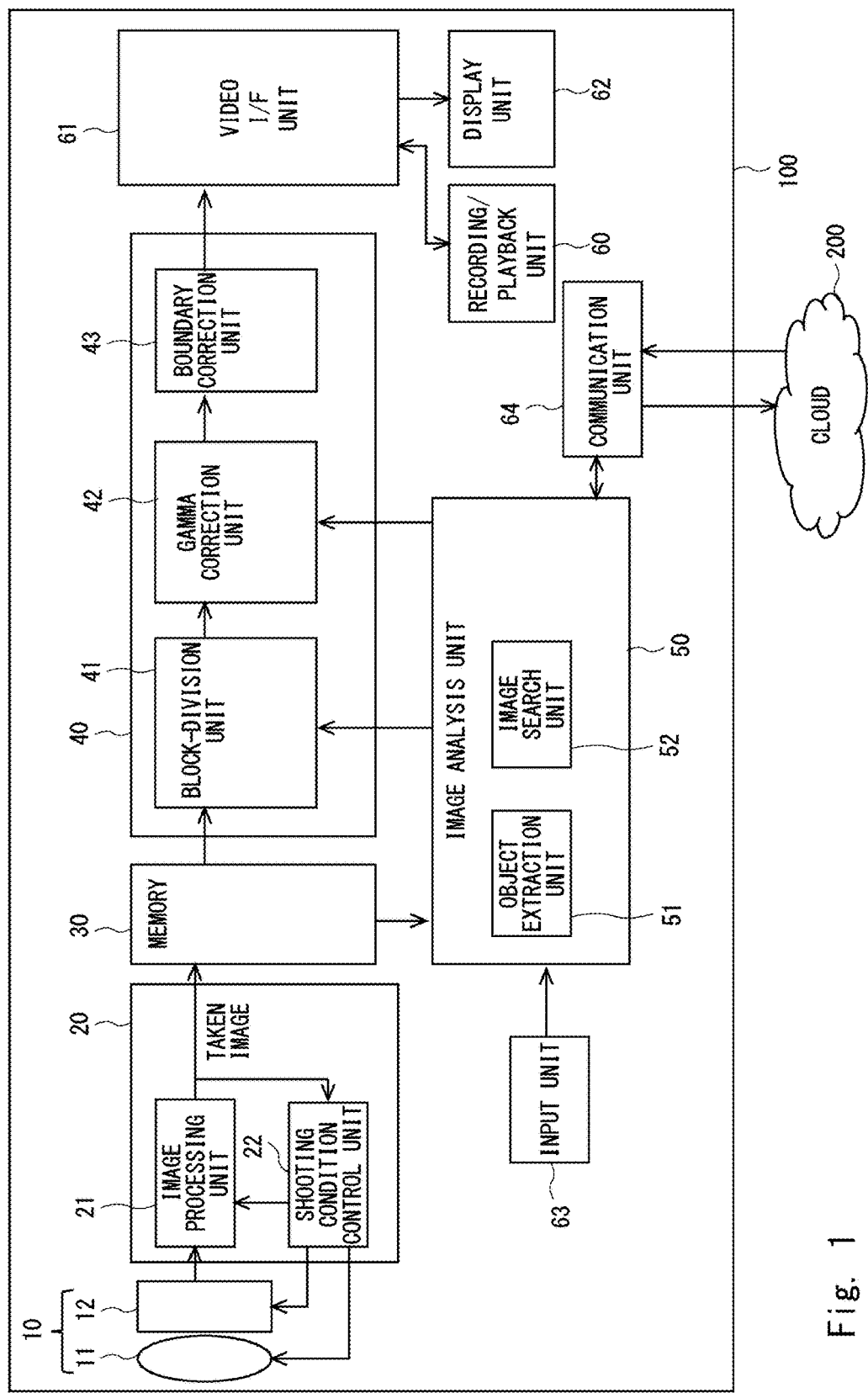
FIG. 1 is a control block diagram showing an image pickup apparatus according to an embodiment.

An image pickup apparatus according to this embodiment is described with reference to FIG. 1. FIG. 1 is a control block diagram showing a configuration of an image pickup apparatus 100. The image pickup apparatus 100 is a video camera that takes moving images and still images. Processes and methods described below may be implemented by computer programs. Specifically, each process may be performed by having an image pickup apparatus equipped with at least one processor execute a program.

The image pickup apparatus 100 includes an image pickup unit 10, a primary control unit 20, a memory 30, a secondary control unit 40, an image analysis unit 50, a recording/playback unit 60, a video interface unit 61, a display unit 62, an input unit 63, and a communication unit 64.

The recording/playback unit 60 includes recording means such as an internal memory or an external memory and records data of taken images. The external memory is, for example, an SD card or a micro-SD card detachably mounted on the image pickup apparatus 100. The recording/playback unit 60 compresses image data of a camera image and writes the compressed image data into the memory.

The display unit 62 includes a display device such as a liquid crystal monitor or an organic EL (Electro-Luminescence) monitor. The display unit 62 is connected to the video interface unit 61 and displays camera images. The display unit 62 plays back images that are taken at that moment or images recorded in the recording/playback unit 60. Further, the display unit 62 displays a window through which a user enters a search condition.

The input unit 63 includes buttons, switches, a touch panel, etc., and receives an operation input entered by a user. For example, the user enters an input for specifying a search condition by operating the input unit 63 while viewing the display unit 62.

The communication unit 64 performs a communication process in accordance with communication standards such as 3G, LTE (Registered Trademark), 4G, Wi-Fi (Registered Trademark), or Bluetooth (Registered Trademark). For example, the communication unit 64 includes a modulation unit that modulates signals, a demodulation unit that demodulates modulated signals, and an antenna through which radio waves are transmitted/received. The communication unit 64 performs communication with a cloud network (also simply referred to as a cloud) 200, which is an external network. In this way, the image pickup apparatus 100 can transmit data to the cloud network 200 and receive data from the cloud network 200.

The cloud network 200 is an external network composed of the Internet and the like, and accumulates (i.e., stores) a plurality of images (hereinafter also referred to as network images). The cloud network 200 may store, in addition to images taken by the image pickup apparatus 100, images taken by an image pickup apparatus (e.g., a camera) other than the image pickup apparatus 100 as network images. The cloud network 200 may be a network accessible by the general public or may be a network accessible only by authenticated users.

The image pickup unit 10 includes a lens unit 11 and a sensor 12. The lens unit 11 includes, for example, a shutter, an iris, a zoom lens, and a focus lens. The lens unit 11 also includes actuators that drive the shutter, the iris, the zoom lens, and the focus lens.

The sensor 12 is an image pickup element that takes an image including an object through the lens unit 11. The sensor 12 is composed of a CCD (Charge Coupled Device) sensor, a CMOS (Complementary Metal Oxide Semiconductor) sensor, or the like.

The sensor 12 outputs the taken image to the primary control unit 20. The primary control unit 20 controls a shooting condition(s) for the image pickup unit 10 based on the taken image. Specifically, the primary control unit 20 includes an image processing unit 21 and a shooting condition control unit 22. The primary control unit 20 can be implemented, for example, by using an ISP (Image Signal Processor).

Figure 2:
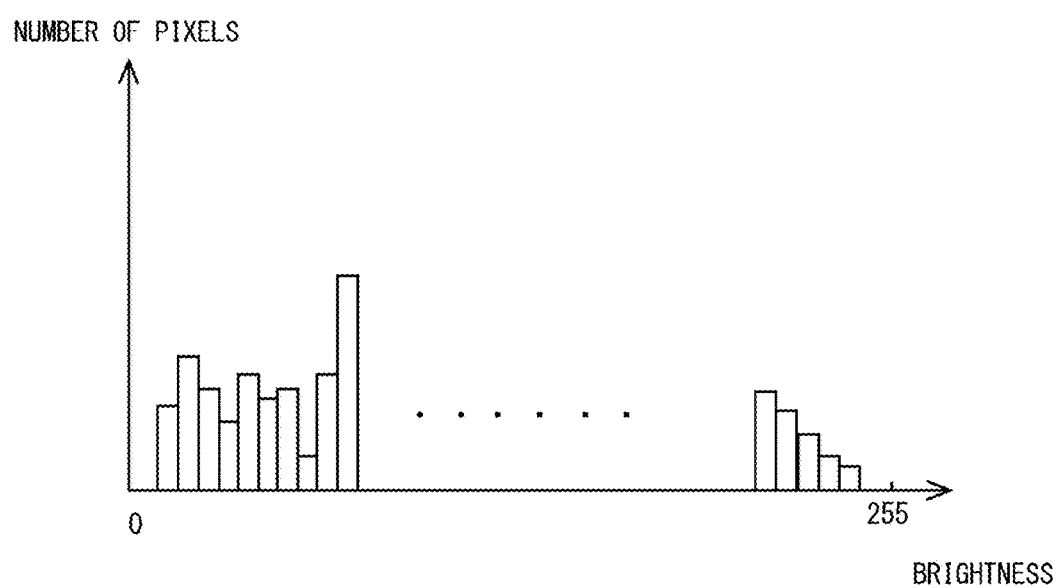
FIG. 2 is a graph schematically showing histogram data.

The image processing unit 21 generates, for example, histogram data of the taken image. As shown in FIG. 2, the histogram is data indicating the number of pixels for each brightness level. In FIG. 2, a horizontal axis indicates brightness and a vertical axis indicates the number of pixels. In FIG. 2, since the pixels of the taken image have eight bits, the horizontal axis indicates integers from 0 to 255. Note that the histogram data may be generated for gradation values for each of RGB, instead of being generated for the combined brightness of RGB.

The image processing unit 21 determines whether or not a blown out highlight occurs based on the histogram data and outputs a result of the determination to the image pickup condition control unit 22. The shooting condition control unit 22 controls the shooting condition for the image pickup unit 10 based on the determination result. That is, the shooting condition control unit 22 generates a shooting control signal for controlling an exposure in the image pickup unit 10 and outputs the generated shooting control signal to the sensor 12 and the lens unit 11.

Specifically, the shooting condition control unit 22 outputs a shooting control signal for controlling the iris, the electronic shutter, the gain, or the like to the image pickup unit 10. In this way, the iris, the electronic shutter, and/or the gain are adjusted and hence the exposure can be controlled. The primary control unit 20 can control brightness of the taken image so that its histogram data does not exceed the upper limit.

When the taken image exceeds the upper limit, the shooting condition control unit 22 stops down the iris of the lens unit 11. Alternatively, the primary control unit 20 adjusts a shutter speed so that an exposure time of the electronic shutter of the sensor 12 is shortened. Alternatively, the shooting condition control unit 22 lowers the gain of the sensor 12. In this manner, the primary control unit 20 can control the exposure by controlling at least one of the aperture, the shutter speed, and the gain.

The primary control unit 20 controls the shooting condition so that no blown out highlight occurs in any part of the taken image. In this way, it is possible to take an image under an appropriate shooting condition and thereby to acquire a taken image in which brightness is not saturated. When moving images are taken, feedback control is performed for the shooting condition so that no blown out highlight occurs in each frame. The primary control unit 20 writes the taken image into the memory 30.

Figure 3:
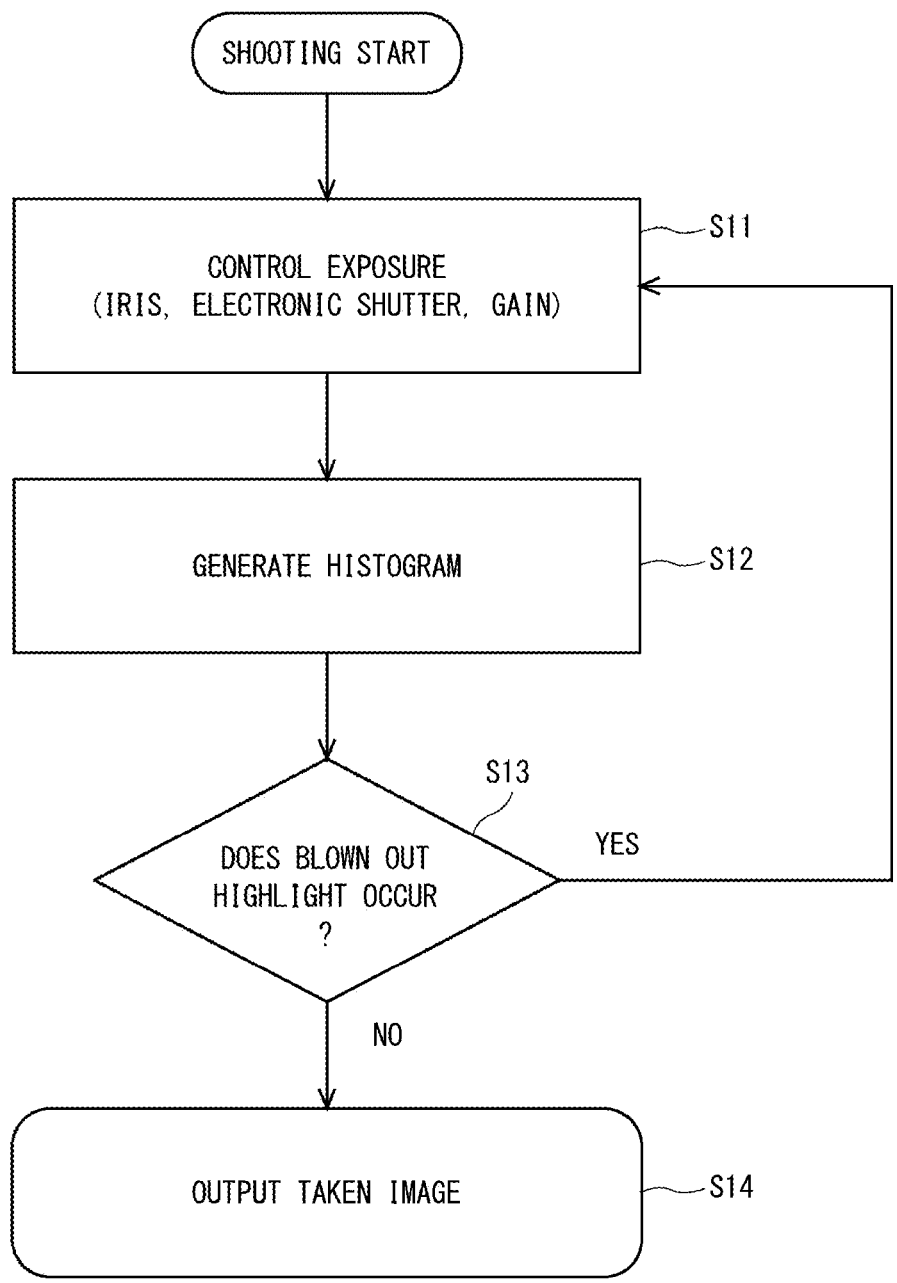
FIG. 3 is a flowchart showing processes performed in a primary control unit 20.

FIG. 3 is a flowchart showing processes performed in the primary control unit 20. When a user presses a shooting start button and thereby starts an image pickup process, the shooting condition control unit 22 controls the exposure by using the iris, the electronic shutter, and/or the gain (S11). In this example, the image pickup unit 10 takes an image under a default condition. Next, the image processing unit 21 generates histogram data of the taken image (S12).

The image processing unit 21 determines whether or not a blown out highlight occurs in the taken image based on the histogram data (S13). In this example, when the histogram data exceeds the upper limit, the image processing unit 21 determines that a blown out highlight occurs. When it is determined that a blown out highlight occurs (Yes at S13), the process returns to the step S11 and the shooting condition control unit 22 controls the exposure. That is, the shooting condition control unit 22 adjusts at least one of the aperture, the shutter speed, and the gain.

When it is determined that no blown out highlight occurs (No at S13), the primary control unit 20 outputs the taken image to the memory 30 (S14). As a result, the taken image in which no blown out highlight occurs is written into the memory 30.

The explanation is continued by referring to FIG. 1 again. The secondary control unit 40 and the image analysis unit 50 read the taken image stored in the memory 30 and perform predetermined processes. The secondary control unit 40 includes a block-division unit 41, a gamma correction unit 42, and a boundary correction unit 43. The secondary control unit 40 is implemented, for example, by using an ISP (Image Signal Processor).

The image analysis unit 50 analyzes the taken image by using AI (Artificial Intelligence). Specifically, the image analysis unit 50 includes an object extraction unit 51 and an image search unit 52. The image analysis unit 50 is equipped with an image search engine using AI. The image analysis unit 50 can perform an image search by performing an image analysis using AI. The image search engine included in the image analysis unit 50 may have been trained in advance through deep learning, machine learning, etc.

Figure 4:
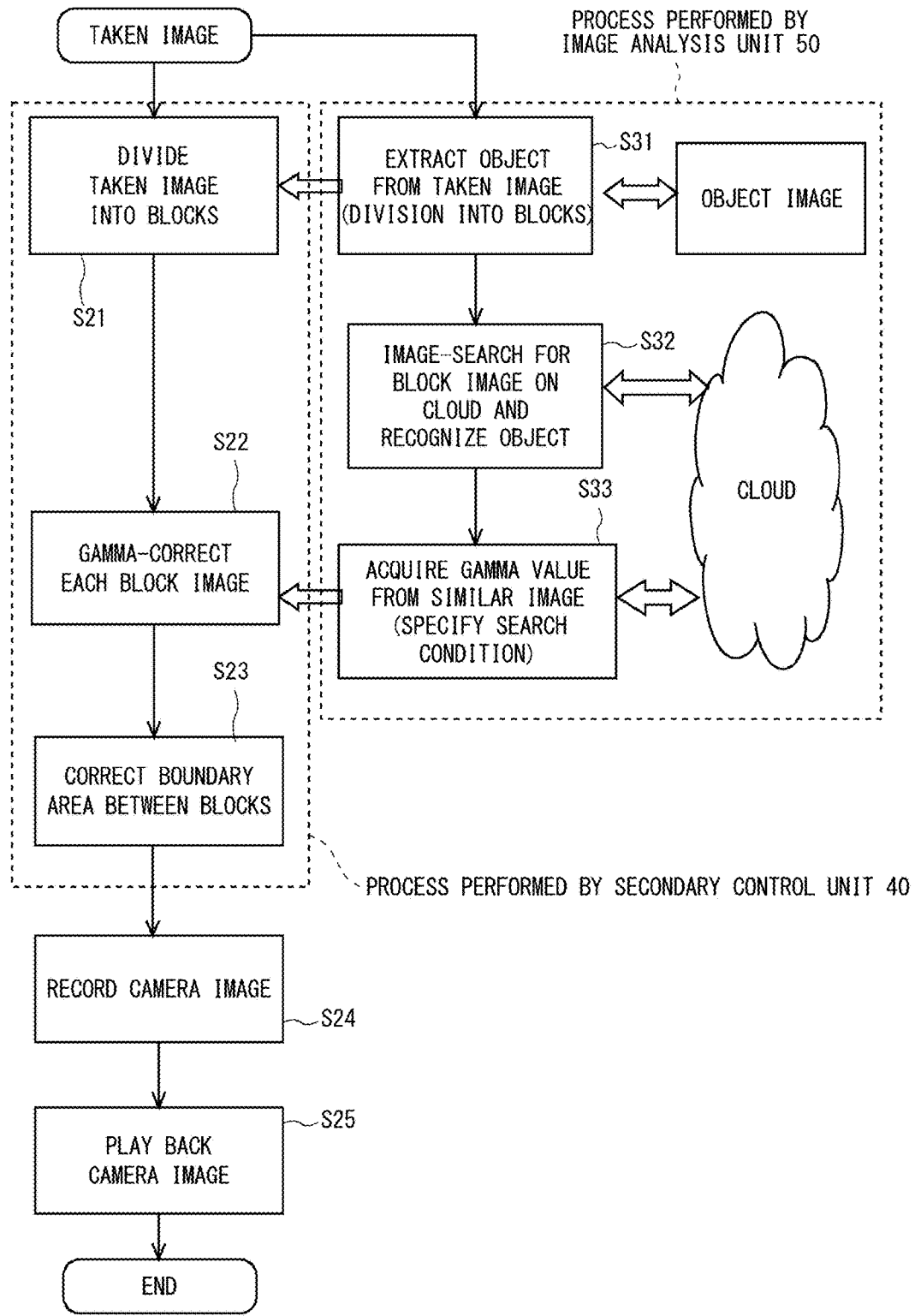
FIG. 4 is a flowchart showing processes performed in a secondary control unit 40 and an image analysis unit 50.
Figure 5:
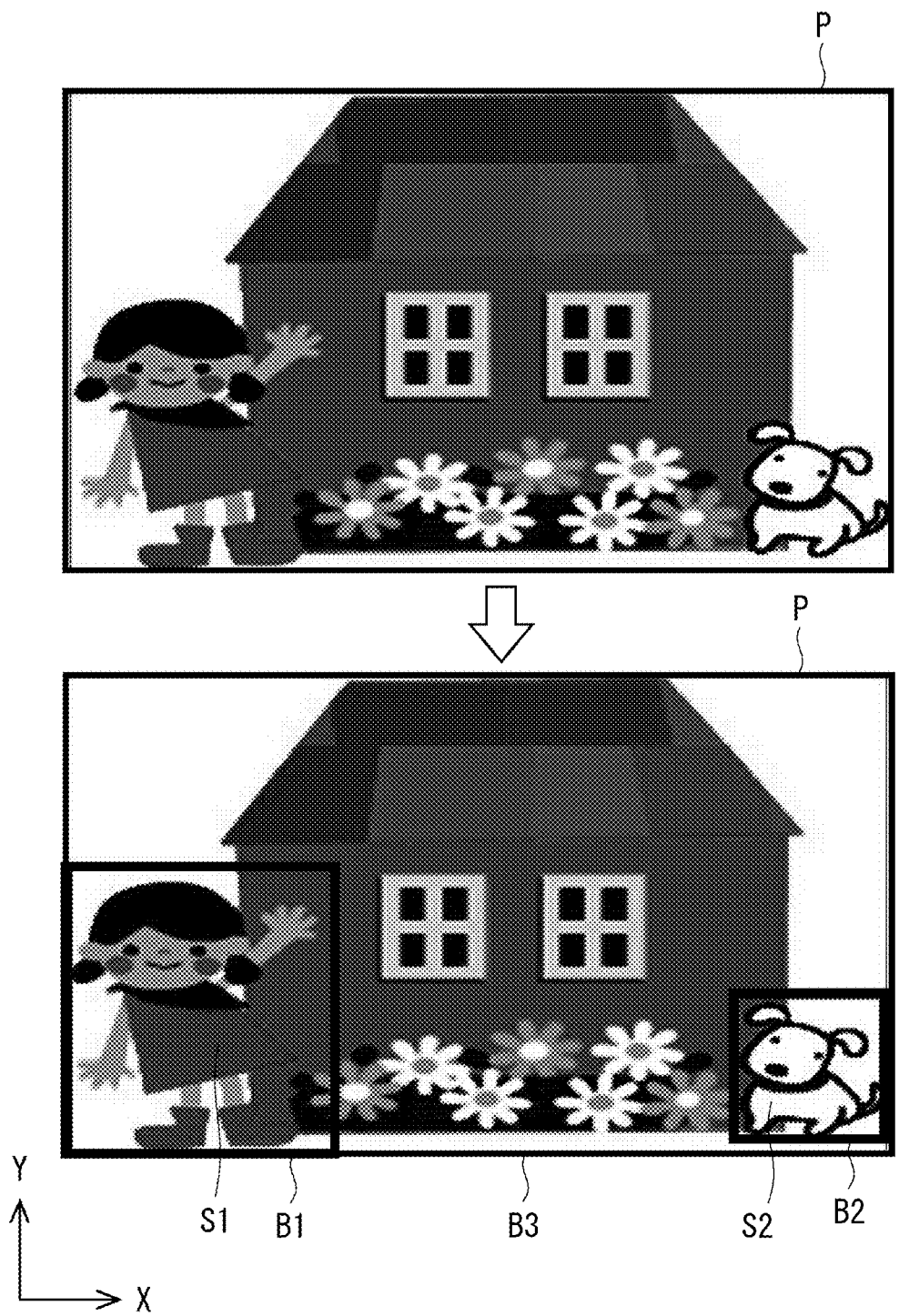
FIG. 5 is a schematic diagram showing a taken image divided into blocks.

Processes performed in the secondary control unit 40 and the image analysis unit 50 are described hereinafter with reference to FIGS. 4 and 5. FIG. 4 is a flowchart showing processes performed by the secondary control unit 40 and the image analysis unit 50. FIG. 5 is a diagram for explaining a process for dividing an image into blocks and schematically shows a taken image P. Note that the taken image P has a rectangular shape whose long-side direction is in parallel with an X-direction and whose short-side direction is in parallel with a Y-direction.

Processes performed by the image analysis unit 50 are described. The object extraction unit 51 compares the taken image with an object image by using AI and extracts an object included in the taken image (S31). The object extraction unit 51 performs a simple search for the object included in the taken image P by using an image recognition technique. As a result, the taken image P is divided into blocks so that each block includes a respective object as shown in FIG. 5. For example, a rectangular frame surrounding an object is defined as a block. Further, for each pair of adjoining blocks, the object extraction unit 51 estimates a front/rear relation between adjoining blocks and outputs a result of the estimation to the secondary control unit 40.

In FIG. 5, the taken image P is divided into three blocks, i.e., a block B1 including an object S1, a block B2 including an object S2, and a block B3 other than the blocks B1 and B2 (i.e., a block B3 including the area that is included in neither of the blocks B1 and B2). The object S1 is a person and the object S2 is a dog. The block B3 is a block including no object. Note that examples of the object include people, animals (dogs, cats, horses, etc.), plants (flowers, grasses, and trees), buildings, vehicles (automobiles, trains, airplanes, and ships), landscapes, etc.

The object extraction unit 51 extracts an object included in the taken image P by performing pattern matching between the taken image P and an object image. The object extraction unit 51 refers to object images that are stored in advance in the recording/playback unit 60. Then, the object extraction unit 51 compares the object image with the taken image and recognizes an area in the taken image where a matching level is high as an object. Object images may be accumulated (i.e., stored) in the image pickup apparatus 100 itself, or may be network images accumulated (i.e., stored) on the cloud network 200.

The object extraction unit 51 divides the taken image P into a plurality of blocks. The object extraction unit 51 determines a boundary line between adjoining blocks. The object extraction unit 51 generates a block so that the block does not cross a contour of the extracted object. Note that an image included in a block is referred to as a block image. The object extraction unit 51 generates block information indicating a position (pixel coordinates) and a size (a pixel size) of each block image. In FIG. 5, the block images of the blocks B1 and B2 have rectangular shapes according to the sizes of their objects. One block image includes an object extracted in the step S31. Needless to say, two or more objects may be included in one block image. Further, an area from which no object is extracted may be defined as one block.

The image analysis unit 50 may accumulate (i.e., store) block images of objects retrieved in the step S31 as new object images. For example, the image pickup apparatus 100 stores object images in the form of a database (DB). Alternatively, the image pickup apparatus 100 may upload object images to the cloud network 200. Then, the object extraction unit 51 may refer to newly accumulated object images and thereby extract objects. In the case of accumulating object images, recognized object images may be stored together with information about the objects (such as individual names and properties) and gamma information. Further, AI may be trained by using object images.

Note that when a comparison with a network image stored on the cloud network 200 is performed, the communication unit 64 performs a communication process. Note that the process performed in the object extraction unit 51 may be performed by using AI, or may be performed without using AI. The object extraction unit 51 may recognize the extracted object and acquire its information.

Next, the image search unit 52 recognizes an object by searching the cloud network 200 for the block image of the extracted object (S32). The image search unit 52 searches the cloud network 200 for an image similar to the block image (hereinafter referred to as a similar image) by performing a cloud search using AI. The similar image is preferably a network image including the same object as the object included in the block image. The image search unit 52 can search for a similar image in real time by using AI. For example, the image search unit 52 searches for a similar image for each scene or each frame.

The image search unit 52 accesses the cloud network 200, which is an external network, and thereby searches for a similar image similar to the block image. The image search unit 52 searches for a similar image for each block image. In the example shown in FIG. 5, since there are three blocks, i.e., the blocks B1 to B3, the image search unit 52 searches for three similar images. The image search unit 52 specifies one similar image for one block. Then, the image search unit 52 refers to information attached to the similar image and thereby recognizes the object. In this way, the image search unit 52 can specify an object included in each block. For example, the image search unit 52 specifies an individual name and a property(ies) of the object.

Next, the image search unit 52 acquires an optimal gamma value from the retrieved similar image (S33). For example, when a gamma value is attached to the similar image as tag data, the image search unit 52 reads the gamma value attached to the similar image. In FIG. 5, a gamma value is set for each of the blocks B1 to B3. The gamma value corresponding to the block B1 is referred to as γ1. Similarly, the gamma values corresponding to the blocks B2 and B3 are referred to as γ2 and γ3, respectively. The gamma values γ1 to γ3 may be different from one another, or some of them may be the same as each other.

The image search unit 52 performs an image search which is more elaborate than the image search for extracting an object performed by the object extraction unit 51. The number of network images stored in the cloud network 200 is larger than the number of taken images stored in the image pickup apparatus 100. Therefore, an object can be recognized more accurately. For example, in the case where the object is a person, it is possible to specify a sex, an age (a generation), an individual name, etc. of the object by the elaborate search performed by the image search unit 52. Consequently, it is possible to recognize the object with higher accuracy. Therefore, the image analysis unit 50 can acquire an appropriate gamma value.

Further, in the steps S32 and S33, the search for a similar image may be performed according to a search condition specified by a user. For example, a user can enter a search condition by operating the input unit 63. Examples of the search condition include the number of accesses and a period (e.g., 80's or 90's). Then, the image search unit 52 retrieves a network image that conforms to the search condition as a similar image.

When a search condition in which the number of accesses is prioritized is specified, the image search unit 52 retrieves a network image to which the number of accesses is larger as a similar image. For example, among network images each of which includes the same object as that of the taken image, a network image to which the number of accesses is largest, i.e., the most popular network image is selected as a similar image. Alternatively, a threshold for the number of accesses may be defined. Then, a network image that is accessed number of times equal to or larger than the threshold may be used as a similar image. For example, the number of times of browsing on the network can be used as the number of accesses.

A period (i.e. beginning and/or end of time) in which an image was taken may be used as a search condition. In this case, among network images stored in the cloud network 200, the image search unit 52 retrieves a network image having a shooting date that matches with the search condition as a similar image. Among network images each of which includes the same object as that of the taken image, those that do not match with the search condition are not used as similar images. For example, it is possible to specify a period (a range of shooting date/time) by referring to information attached to a network image.

In this way, the image search unit 52 can retrieve an appropriate similar image. Further, since search targets can be narrowed down on the cloud network 200, a search can be performed at a high speed. Various conditions can be applied as search conditions. The search condition may be a shooting time period (daytime, evening, night, etc.), a shooting place (indoor, outdoor, etc.), a shooting environment (a light source such as sunlight and fluorescent light), and so on.

Among network images that conform to the search condition, a network image having highest similarity becomes a similar image. Further, a user may specify two or more search conditions. In such cases, it is possible to perform a search while setting a priority order for the search conditions.

Further, it is also possible to use object information relevant to an object extracted from the taken image P as a search condition. The object information is, for example, the number of objects included in the taken image P and/or a ratio of an area occupied by the object to the entire area of the taken image P (hereinafter also referred to as an area ratio of an object). The image search unit 52 retrieves a network image whose object information matches with or is similar to the search condition as a similar image. The object extraction unit 51 or the image search unit 52 extracts object information from the taken image P. Then, the image search unit 52 defines a range in which the number of objects and/or the area ratio of the object are considered to be similar as a search condition and performs an image search with the search condition. As described above, since the image search unit 52 performs an image search based on object information, it can retrieve a more appropriate similar image.

By doing so, it is possible to set an appropriate gamma value for each block. By specifying the number of accesses as a search condition, the image search unit 52 can acquire a trendy gamma value with a large number of accesses. By specifying the period as a search condition, it is possible to acquire a gamma value that was popular in that period.

Note that the process performed in the image analysis unit 50 can be implemented by having the communication unit 64 perform communication processes as appropriate. For example, when a network image is searched for, the communication unit 64 performs a process for transmitting data necessary for the search process to the cloud network 200. Further, the communication unit 64 performs a process for receiving data of a result of the process.

Next, processes performed in the secondary control unit 40 are described. Firstly, the block-division unit 41 divides the taken image into a plurality of blocks (S21). In this example, the block-division unit 41 divides the taken image into blocks including respective images based on a result of the search performed by the object extraction unit 51. That is, the block-division unit 41 generates block images including respective objects based on block information obtained by the simple search performed in the step S31. Further, the block-division unit 41 adds block information for each frame or each scene. The block information includes a position and/or a size of the block image. The block-division unit 41 outputs the taken image, to which the gamma information has been added, to the gamma correction unit 42.

Next, the gamma correction unit 42 performs a gamma correction for each block image (S22). That is, the gamma correction unit 42 performs a gamma correction for each block of the taken image with the gamma value acquired by the image search unit 52. The gamma correction unit 42 performs a gamma correction for the block image of the block B1 with the gamma value $\gamma 1$. Similarly, the gamma correction unit 42 performs a gamma correction for the block image of the block B2 with the gamma value $\gamma 2$ and performs a gamma correction for the block image of the block B3 with the gamma value $\gamma 3$. Further, the gamma correction unit 42 adds a gamma value of each block as gamma information for each frame or each scene. The gamma correction unit 42 adds gamma information to the gamma-corrected taken image and outputs it to the boundary correction unit 43.

Note that the gamma correction unit 42 gamma-corrects gradation values of the taken image as expressed by the below-shown Expression (1).

$$Y=X^\gamma \qquad (1)$$

X is an input value of the gradation value and Y is an output value thereof. Each of X and Y represents a gradation value (e.g., 0 to 255) as a value from 0 to 1. The symbol $\gamma$ represents a gamma value set for each block. In the above-shown example, they are gamma values $\gamma 1$ to $\gamma 3$. The gamma values $\gamma 1$ to $\gamma 3$ may be different from one another, or some of them may be the same as each other. Note that the gamma correction unit 42 may perform a gamma correction by using a lookup table that records data for each gamma value.

The boundary correction unit 43 corrects a boundary area between adjoining blocks (S23). As described above, the gamma correction unit 42 performs a gamma correction for each block by using a gamma value set for each block. Therefore, two adjoining blocks may have difference gradation values at the boundary therebetween after the gamma correction even when they originally have the same gradation values in the taken image. In such cases, a displayed image becomes unnatural at the boundary between the blocks. Therefore, the boundary correction unit 43 corrects gradation values at the boundary area between two adjoining blocks. In this way, it is possible to smooth gradation changes in the boundary area.

Figure 6:
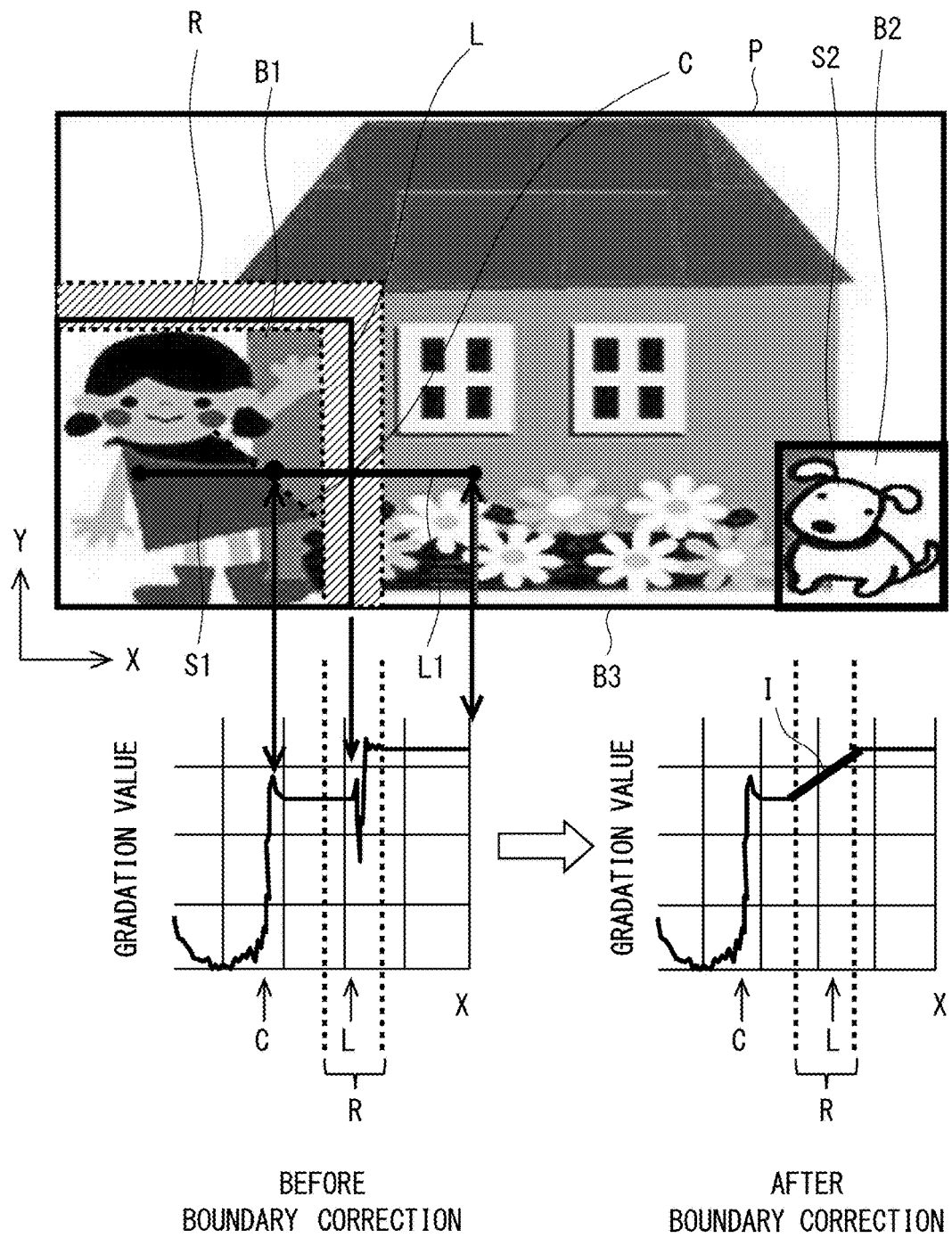
FIG. 6 is a diagram for explaining a process for correcting a boundary between blocks.

A boundary correction performed by the boundary correction unit 43 is described in detail with reference to FIG. 6. FIG. 6 is a diagram for explaining a correction in a boundary area between blocks B1 and B3, and shows an example in which the taken image P shown in FIG. 5 is corrected. In FIG. 6, a waveform chart of gradation values before a boundary correction is performed and a waveform chart after the boundary correction are shown below the taken image P. As shown in FIG. 6, a boundary between adjoining blocks B1 and B3 is indicated by a boundary line L. The boundary line L has a rectangular shape.

In FIG. 6, waveform charts showing changes in gradation values along a straight line L1 perpendicular to the boundary line L extending in the Y-direction are shown. In the waveform charts shown in FIG. 6, a horizontal axis indicates positions in the X-direction and a vertical axis indicates gradation values.

Further, a boundary between blocks A and C is indicated by a boundary area R. The boundary area R is an area including the boundary line L. The boundary area R is an area formed along the boundary line L. The boundary area R includes a plurality of pixels in a width direction, which is a direction perpendicular to the boundary line L. The boundary correction unit 43 determines pixel coordinates of the boundary area R. The boundary line L and the boundary area R are defined so that they do not overlap a contour C of an object S1. The setting of the boundary area R will be described later.

The boundary correction unit 43 corrects gradation values of pixels included in the boundary area R. Specifically, the boundary correction unit 43 interpolates the gradation values of the pixels in the boundary area R so that the gradation values gradually change in the boundary area R. In this example, the boundary correction unit 43 linearly interpolates the gradation values between a pixel located at one end of the boundary area R and a pixel at the other end thereof (indicated by an interpolation straight line I in FIG. 6). The boundary correction unit 43 interpolates the gradation values of the pixels in the boundary area R by using the pixels at the both ends of the boundary area R. It is possible to smoothly change the gradation values in the width direction in the boundary area R. That is, the gradation values gradually increase or decrease from one end of the boundary area R toward the other end thereof. Therefore, it is possible to display the boundary area R between the blocks without causing unnaturalness.

Further, since the boundary area R is defined so as not to overlap the contour C of the object S1, the contour C of the object S1 can be maintained. Even when the adjoining blocks are gamma-corrected with different gamma values, the object can be displayed without causing unnaturalness.

The explanation is continued by referring to FIG. 4 again. The secondary control unit 40 records the image, for which the gamma correction and the boundary correction have been carried out (hereinafter referred to as a camera image), in the recording/playback unit 60 (S24). Further, the display unit 62 displays the camera image on the monitor (S25). In this way, the secondary control unit 40 can output the camera image.

As described above, the image pickup apparatus 100 extracts objects from the taken image P and sets a gamma value for each individual object. The image pickup apparatus 100 can perform a gamma correction by using an appropriate gamma value for each object. The image pickup apparatus 100 can expand a dynamic range so that neither a blown out highlight nor a blocked up shadow occurs in each object. Therefore, the image pickup apparatus 100 can single-handedly generate high-quality HDR (High Dynamic Range) images. Further, since the gradation values in the boundary area R are corrected, the gradation changes can be smoothed.

The image analysis unit 50 searches the cloud network 200 for a similar image by performing an image search using AI. The image analysis unit 50 sets a gamma value based on the similar image. In this way, it is possible to perform a gamma correction with an optimal gamma value corresponding to the object.

In the cloud search, it is possible, by specifying a search condition, to set a popular gamma value or to set, by specifying a period, a gamma value that was trendy at that time. Therefore, it is possible to achieve desired image quality. Further, it is possible to improve the accuracy of the extraction in the object extraction unit 51 by accumulating images of newly extracted objects as object images.

Figure 7:
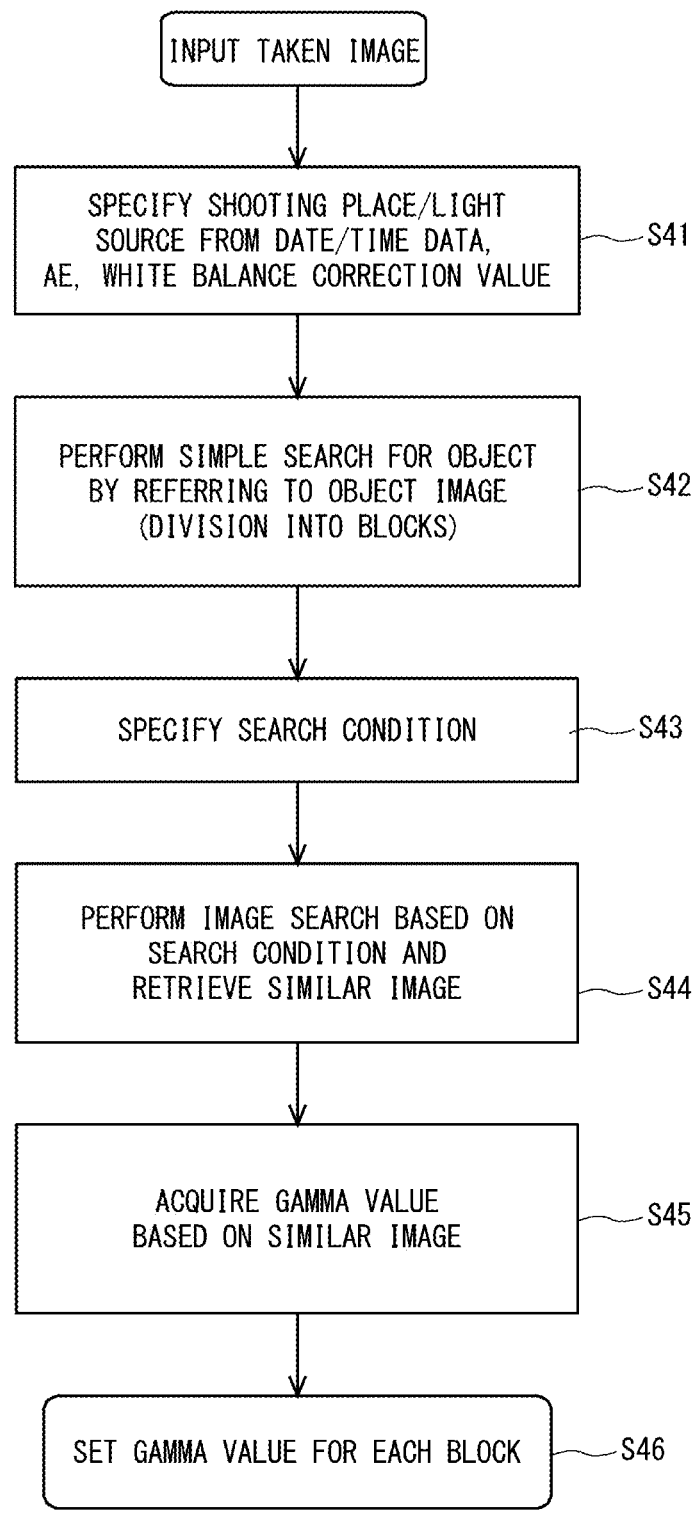
FIG. 7 is a flowchart showing an analysis process performed in the image analysis unit 50.
Figure 8:
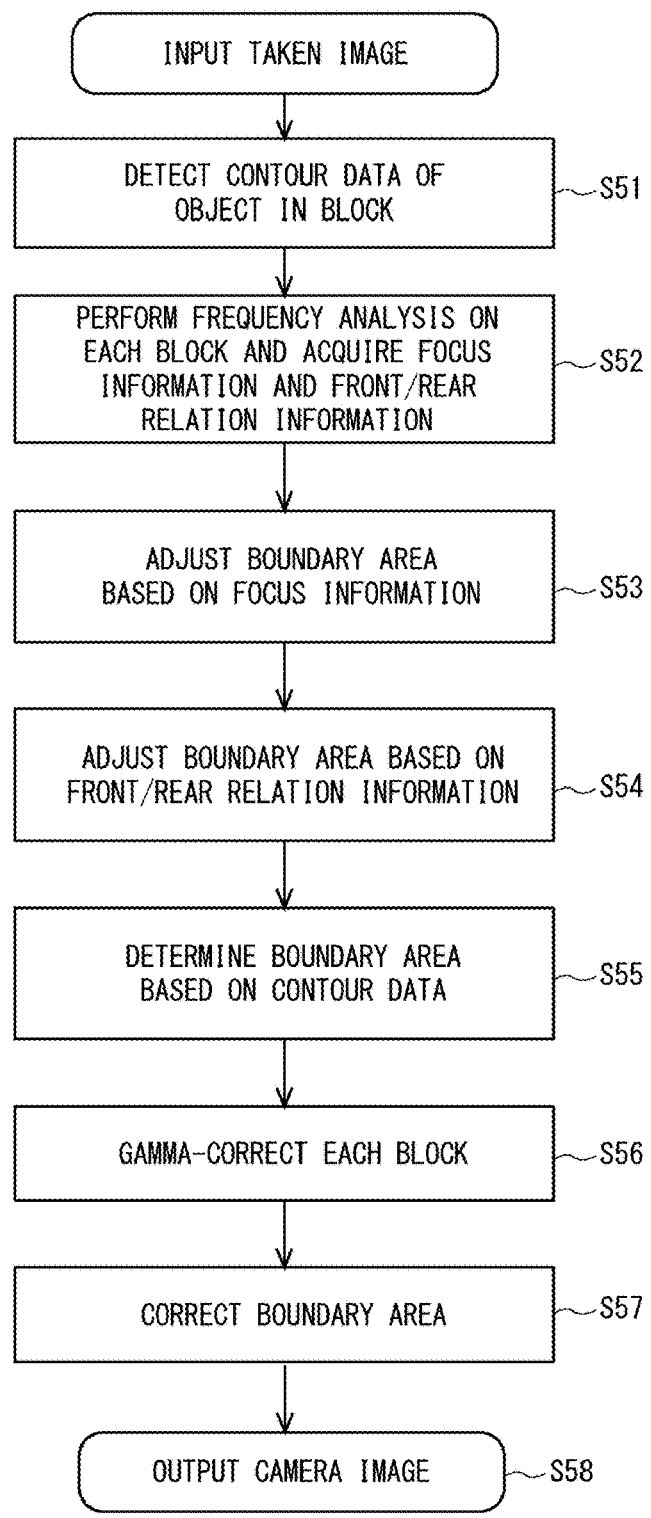
FIG. 8 is a flowchart showing a correction process performed in the secondary control unit 40.

An example of the analysis process performed in the image analyzer unit 50 is described with reference to FIG. 7. FIG. 8 is a flowchart showing processes performed by the image analysis unit 50.

Firstly, the object extraction unit 51 specifies a shooting place or a light source of the taken image from date/time data, AE, and a white balance correction value of the taken image (S41). For example, the object extraction unit 51 specifies whether the shooting place is indoor or indoor. Alternatively, the object extraction unit 51 specifies whether the light source is an incandescent lamp or a fluorescent lamp, or whether it is sunny or cloudy.

Then, the object extraction unit 51 performs a simple search for an object by referring to an object image (S42). In this example, it is possible to extract an object with high accuracy by using information relevant to at least one of the shooting place and the light source. Then, the object extraction unit 51 divides the taken image P into blocks based on objects extracted by the simple search.

Next, the image search unit 52 inputs a search condition for the cloud search (S43). For example, the search condition is specified based on an input operation by a user. Alternatively, the image search unit 52 may perform a search by using a predetermined search condition. Alternatively, the search condition may be automatically input based on object information or the like extracted from the taken image P.

The image search unit 52 performs an image search on the cloud network 200 based on the search condition and retrieves a similar image similar to the block image (S44). Then, the image search unit 52 acquires a gamma value based on the similar image (S45). For example, when a gamma value is attached to the similar image, the gamma value of the similar image is acquired as a gamma value of the block image.

The image analysis unit 50 sets a gamma value for each block (S46). That is, it is possible to set a gamma value for each block by performing the processes in the steps S44 and S45 for each block.

Note that when the no information about the gamma value is attached to the similar image, the image analysis unit 50 may acquire a gamma value by analyzing the similar image. For example, the image analysis unit 50 generates a histogram of gradation values of the similar image. Then, the image analysis unit 50 may estimate a gamma value of the similar image by analyzing a distribution in the histogram. For example, the image analysis unit 50 extracts feature values from the distribution in the histogram and estimates a gamma value based on the extracted feature values.

Next, processes performed in the secondary control unit 40 are described with reference to FIG. 8. FIG. 8 is a flowchart showing a process for correcting the taken image P. Note that block information has already been input from the image analysis unit 50 to the secondary control unit 40.

Firstly, the block-division unit 41 detects contour data of the object in the block (S51). For example, the block-division unit 41 can acquire contour data of the object by performing edge detection on the block image. The contour data is data indicating positions of pixels constituting the contour of the object in the block image.

The block-division unit 41 acquires focus information and front/rear relation information by performing a frequency analysis on the block image (S52). Specifically, the block-division unit 41 calculates a frequency characteristic of the block image by performing a discrete Fourier transform on the block image. For example, the block-division unit 41 can acquire a frequency characteristic of the block image by performing a two-dimensional fast Fourier transform.

The block-division unit 41 acquires focus information and front/rear relation information based on the frequency characteristic. The focus information is information indicating the degree of focus in the block image, or information indicating whether the block image is in focus or is blurred. It is possible to determine whether or not the block image (the object) is in focus based on the focus information. It is possible to estimate a distance relation in the front/rear direction with respect to a properly-focused object base on the degree of focus. It is presumed that the more the object is out of focus, the farther the object is apart from the properly-focused object. Regarding on which side in the front/rear direction the object is apart from the properly-focused object, the block-division unit 41 can refer to a result of estimation as to the front/rear relation obtained by the image analysis unit 50.

The front/rear relation information is information indicating a positional relation of the object in the front/rear direction. It is possible to detect the front/rear relation between objects included in adjoining blocks based on the front/rear relation information. That is, it is possible to specify, among two objects included in adjoining blocks, an object located on the front side and an object located on the rear side based on the front/rear relation information. Note that the block-division unit 41 may obtain the front/rear relation information by using contour data as well as the frequency component and the estimation result by the image analysis unit 50. For example, in the case where contours of objects in adjoining blocks overlap each other, it is determined, based on the contour data, that one of the blocks images is located in front of the other block image when the one of the block images obstructs (i.e., partially covers) the contour of the other block image. By doing so, the front/rear relation information is acquired.

The block-division unit 41 adjusts the boundary area based on the focus information (S53). In this example, the gamma correction unit 42 defines a boundary area while prioritizing the properly-focused block. For example, at a boundary between the properly-focused block B1 and the out-of-focus block B3, the block-division unit 41 defines a boundary area R while prioritizing the block B1. The gamma correction unit 42 defines a boundary area R so that a distance from an end of the boundary area R on the block B1 side to the boundary line L becomes smaller than a distance from an end of the boundary area R on the block B3 side to the boundary line L. That is, the boundary area in the out-of-focus block becomes larger than the boundary area in the properly-focused block.

Next, the block-division unit 41 adjusts the boundary area based on the front/rear relation information (S54). In this example, the block-division unit 41 defines the boundary area while prioritizing the block including the object that is located on the front side among the two objects. For example, when the object included in the block B1 is located in front of the object included the block B3, the block-division unit 41 defines a boundary area R while prioritizing the block B1. The gamma correction unit 42 defines a boundary area R so that a distance from an end of the boundary area R on the block B1 side to the boundary line L becomes smaller than a distance from an end of the boundary area R on the block B3 side to the boundary line L. That is, the boundary area R in the block including the object located on the rear side becomes larger than the boundary area R in the block including the object located on the front side.

The block-division unit 41 determines a boundary area based on the contour data (S55). In this example, the block-division unit 41 adjusts a size and a position of the boundary area by referring to the contour data extracted in the step S51 so that the contour of the object does not overlap the boundary area. When the contour overlaps the boundary area adjusted in the steps S53 and S54, the block-division unit 41 reduces or shifts the boundary area. As long as the contour of the object on the front side can be secured, the contour of the object on the rear side may overlap the boundary area. That is, the block-division unit 41 may preferentially secure the contour of the object on the front side by referring to the front/rear relation information.

The gamma correction unit 42 performs a gamma correction for each block (S56). That is, the gamma correction unit 42 gamma-corrects gradation values of each block image by using a gamma value set for each block. Note that the gamma correction unit 42 may perform a gamma correction for the area other than the boundary area. The boundary correction unit 43 corrects the boundary area (S57). That is, as shown in FIG. 6, the boundary correction unit 43 interpolates gradation values in the boundary area by using gradation values of a pixel at one end of the boundary area and a pixel at the other end thereof. The secondary control unit 40 outputs the camera image in which the boundary area has been corrected (S58). In this way, it is possible to generate a natural camera image (i.e., a camera image with no unnaturalness).

Part of the process performed in the image analysis unit 50 may be carried out by the secondary control unit 40. Alternatively, part of the process performed by the secondary control unit 40 may be performed by the image analysis unit 50. Further, the processes performed by the secondary control unit 40 and the image analysis unit 50 may be performed by one processor.

The image pickup apparatus 100 may not perform the image search using AI. For example, an object is extracted without performing an image search on the cloud network 200 by the image analysis unit 50. In this case, the object extraction unit 51 may perform an image search without using AI and then extract an object. Then, the block-division unit 41 divides the taken image into blocks according to the object. Further, the gamma correction unit 42 sets a gamma value for each block based on information on the object extracted by the block-division unit 41. For example, a gamma value may be set in advance for each rough classification of objects. Then, a gamma correction may be performed for each block by using the set gamma value. For example, the object may be roughly classified into groups such as people, animals, buildings, and the like. Then, an appropriate gamma value is set for each group in advance.

In this case, an image pickup apparatus according to this embodiment includes: an image pickup unit configured to take an image including an object; a shooting condition control unit configured to control a shooting condition for the image pickup unit so that no blown out highlight occurs in a taken image taken by the image pickup unit; an object extraction unit configured to extract the object included in the taken image; a block-division unit configured to divide the taken image into a plurality of blocks according to the object extracted by the object extraction unit; a gamma correction unit configured to gamma-correct a gradation value of the taken image for each block by using a gamma value set for each block based on the object; and a boundary correction unit configured to correct the gradation value in a boundary area between adjoining blocks.

The image analysis unit 50 may perform an image search without dividing the taken image into blocks. In this case, the image analysis unit 50 extracts one similar image for the taken image P by performing an image search using AI. Then, the whole taken image P is gamma-corrected with one gamma value. Therefore, the process for correcting the boundary and the like becomes unnecessary.

In this case, an image pickup apparatus according to this embodiment includes: an image pickup unit configured to take an image including an object; a shooting condition control unit configured to control a shooting condition for the image pickup unit so that no blown out highlight occurs in a taken image taken by the image pickup unit; an object extraction unit configured to extract the object included in the taken image; an image search unit configured to search a network for a similar image similar to an object image of the object; and a gamma correction unit configured to gamma-correct the taken image with a gamma value corresponding to the similar image.

Further, it is also possible to make an optimum detailed adjustment to each object by using an object recognition technique. For example, when contours of objects are emphasized, the level of emphasis of the contours may be changed on a block-to-block basis according to the object. It is possible to improve a texture of each block. It is also possible to change the emphasis level of the contours based on the front/rear relation information of the objects. In this case, the contour of an object located on the front side may be more emphasized. By doing this, it is possible to achieve image quality with a stereoscopic effect. By determining the sex of each object, it is possible to apply a beautiful-skin mode on an object-to-object basis.

An image pickup apparatus according to this embodiment includes: an image pickup unit configured to take an image including an object; a shooting condition control unit configured to control a shooting condition for the image pickup unit so that no blown out highlight occurs in a taken image taken by the image pickup unit; an object extraction unit configured to extract the object included in the taken image; a block-division unit configured to divide the taken image into a plurality of blocks according to the object extracted by the object extraction unit; a gamma correction unit configured to gamma-correct a gradation value of the taken image for each block by using a gamma value set for each block based on the object; and a boundary correction unit configured to correct the gradation value in a boundary area between adjoining blocks.

In the above-described image pickup apparatus, the boundary area may be defined based on focus information of a block image of the block.

In the above-described image pickup apparatus, the boundary area may be defined based on the front/rear relation information indicating a front/rear relation between the objects included in the adjoining blocks.

In the above-described image pickup apparatus, the boundary area may be defined so as not to overlap a contour of the object.

In the above-described image pickup apparatus, the boundary correction unit may interpolate gradation values of pixels in the boundary area by using gradation values at both ends of the boundary area.

Some or all of the above-described processes may be performed by a computer program. That is, the above-described processes may be carried out by having a processor included in the image pickup apparatus 100 execute a program(s). The above-described program can be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to the computer by using various types of transitory computer readable media. Examples of the transitory computer readable media include an electrical signal, an optical signal, and an electromagnetic wave. The transitory computer readable media can be used to supply programs to the computer through a wire communication path such as an electrical wire and an optical fiber, or wireless communication path.

The present disclosure made by the inventors of the present application has been explained above in a concrete manner based on embodiments. However, the present disclosure is not limited to the above-described embodiments, and needless to say, various modifications can be made without departing from the spirit and scope of the present disclosure. For example, although the embodiments have been described on the assumption that the shape of the block is a rectangle, the shape of the block is not limited to the rectangle and various shapes may be used for each object. Further, a contour of an object may be used as a boundary of a block. In this case, the whole boundary area is defined in the block located on the rear side.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. An image pickup apparatus comprising:
    an image pickup unit configured to take an image including an object;
    a shooting condition control unit configured to control a shooting condition for the image pickup unit so that no blown out highlight occurs in a taken image taken by the image pickup unit;
    an object extraction unit configured to extract the object included in the taken image;
    an image search unit configured to search a network for a similar image similar to an object image of the object by using AI (Artificial Intelligence); and a gamma correction unit configured to gamma-correct the taken image with a gamma value corresponding to the similar image.

2. The image pickup apparatus according to claim 1, further comprising an input unit configured to receive an input of a search condition, wherein
the image search unit performs a search based on the search condition.

3. The image pickup apparatus according to claim 1, wherein the object extraction unit estimates a gamma value of the similar image by analyzing a histogram of the similar image.

4. The image pickup apparatus according to claim 1, wherein
the taken image is divided into a plurality of blocks according to objects included in the taken image,
the similar image similar to the object image is retrieved for each block, and
a gradation value is gamma-corrected for each block with a gamma value set for each block.

5. The image pickup apparatus according to claim 4, wherein a gradation value of a boundary area between blocks is corrected.

6. An image pickup method comprising:
taking an image including an object;
controlling a shooting condition so that no blown out highlight occurs in the taken image;
extracting the object included in the taken image;
searching a network for a similar image similar to an object image of the object by using AI; and
gamma-correcting the taken image with a gamma value corresponding to the similar image.

7. A non-transitory computer readable medium storing a program for causing an image pickup apparatus to execute:
controlling a shooting condition for a taken image including an object so that no blown out highlight occurs in the taken image;
extracting the object included in the taken image;
searching a network for a similar image similar to an object image of the object by using AI; and
gamma-correcting the taken image with a gamma value corresponding to the similar image.

* * * * *